April 29, 1930. C. O. HOWARD 1,756,643
DETACHABLE WHEEL HUB
Filed Feb. 3, 1928
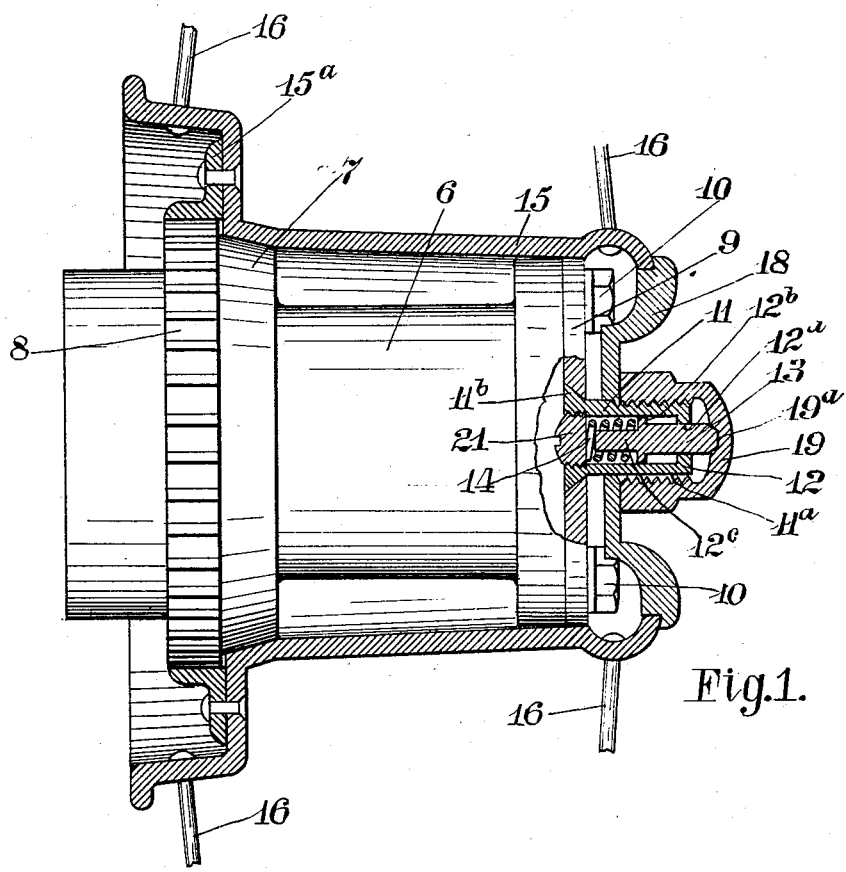
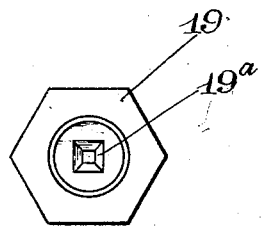
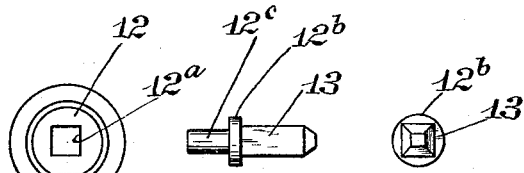
Inventor
CHARLES O. HOWARD Patented Apr. 29, 1930

1,756,643

UNITED STATES PATENT OFFICE

CHARLES O. HOWARD, OF COLUMBUS, OHIO, ASSIGNOR OF ONE-THIRD TO THOMAS K. WISSINGER AND ONE-THIRD TO MILTON A. PIXLEY, BOTH OF COLUMBUS, OHIO

DETACHABLE WHEEL HUB

Application filed February 3, 1928. Serial No. 251,669.

This invention relates more especially to detachable wheels for motor vehicles, and its object, generally, is to provide an improved and simplified means adapted to securely lock the parts together and resist the tendency of such wheels to become released from the axle. A particular object of the invention is to provide a simplification of the construction shown in the Letters Patent of the United States issued May 4, 1926, No. 1,583,043, in that the present construction aims to dispense with the outer hub cap shown in that patent, utilize the retainer plate as the hub cap, and provide means whereby said retainer plate can be latched from accidental release.

The invention is embodied in the example herein shown and described, the features of novelty being finally claimed.

In the accompanying drawing:—

Figure 1 is a view partly in axial section and partly in full lines showing the invention.

Fig. 2 is a view in elevation of the inner side of the nut.

Fig. 3 is a similar view of the end of the stem carried by the inner hub.

Figs. 4 and 5 are side and end views, respectively, of the nut latching pin.

In the views, 6 designates the inner or permanent hub which has the periphery of its inner end provided with a guiding flare portion 7, leading to a tooth portion 8; and its outer end provided with a disk 9, bolted thereto by bolts 10. In the present instance the disk 9 is provided with a hollow central stem 11, externally threaded and flattened on one side, as shown at 11ª, to make it non-circular in cross section. Said stem is made with a cylindrical cavity 12, terminating in a square hole at 12ª at the outer end of the stem. In the cavity of the stem is placed a pin, the outer portion of which is squared at 13 to fit slidably in the hole 12ª, while the inner portion is provided with a circular flange 12ᵇ fitting in the cylindrical portion of the cavity, and a reduced end 12ᶜ, around which is a coil spring 14, held in a partly compressed condition by a threaded plug 21. The spring 14, by pressure on the flange, tends to keep the outer end of the pin yieldingly projected as far as permitted by the shoulder formed at the junction of the cylindrical and square holes of the stem. The outer extremity of the pin is reduced to frusto-pyramidial form for the purpose to be hereinafter explained.

The character 15 designates the outer or removable hub part, it carrying the spokes 16 of the wheel as usual. The outer hub part 15 has riveted to it a flange ring, 15ª, provided with teeth to engage the tooth portion 8 of the permanent hub part to cause the removable hub part to rotate with the permanent hub part after the removable hub part has been shoved onto the permanent hub part with said teeth engaged.

The character 18 designates a combined retainer plate and cap, which is provided centrally with a hole co-dimensional with the non-circular cross section of the stem 11, so as to cause said plate to rotate with said stem and the hub part. The rim of said plate 18 has a rabbet to fit against and close the outer end of the removable hub part, and said plate is held in said position on the stem by means of a threaded cap 19, the bottom of which is formed with a frusto-pyramidal socket 19ª to fit on the complementarily formed end of the pin. When the nut 19 is turned up on the stem to secure the retainer plate in its proper position, it ratchets on the end of the pin, the latter yielding with each quarter turn of the nut as it is advanced. It is desirable, of course, that the parts shall be so constructed that at the time the retainer plate is in tight position the frusto-pyramidal end of the pin shall be squarely seated in the socket of the nut because from that position the nut cannot be jolted, even a fraction of a turn, from its latched position. To apply and remove the nut, its inner rim is hexed as shown to receive the socket wrench.

A convenient and economical mode of applying the stem is to form it as shown in the views with a beveled flange 11ᵇ at its inner end and then welding said flange to a correspondingly beveled opening at the center of the inner side of the disk 9, after which the pin, spring and plug screw 21 can be inserted.

With this construction, the hub is thoroughly dust proof. The combined retainer plate and hub cap and the nut can be made of any attractive design, and the forms of the parts can be changed without departing from the gist of the invention as claimed.

What I claim is:

1. In the combination of a permanent hub part having a threaded stem, a removable hub part, a retainer plate in non-rotative engagement with said stem for securing the removable hub part on the permanent hub part, and a nut threaded on said stem; co-operating latching means in said threaded stem and nut for securing said retainer plate in engagement with the removable hub part.

2. In the combination of a permanent hub part having a threaded stem, a removable hub part, a retainer plate in non-rotative engagement with said stem for securing the removable hub part on the permanent hub part, and a nut threaded on said stem; a spring-held latching pin in said stem co-operating with said nut for securing said retainer plate in engagement with the removable hub part.

3. In the combination of a permanent rotary hub provided with a threaded stem rotating therewith, said threaded stem having a non-circular portion, a removable hub part on said permanent hub and means connecting them to cause them to rotate together, and a retainer plate for the removable hub part, having a non-circular opening engaging the non-circular portion of the threaded stem to cause the retainer plate to rotate with the two hub parts; a nut on said threaded stem to hold the retainer plate in position, and latching means in said stem to engage said nut.

4. In the combination of a permanent hub part including a stem, a removable hub part, a retainer plate for non-rotative engagement with said stem and a nut threaded on said stem; a removable disk forming a portion of said permanent hub part said disk carrying the said stem, a spring actuated pin in said stem and means removably retaining said spring actuated pin in said disk, said pin co-operating with said nut to secure the retainer plate in engagement with the removable hub part.

CHARLES O. HOWARD.